(12) United States Patent  (10) Patent No.: US 7,527,034 B2
Gaertner  (45) Date of Patent: May 5, 2009

(54) METHOD FOR OPERATING A COMPRESSION IGNITION INTERNAL COMBUSTION ENGINE

(75) Inventor: Uwe Gaertner, Remshalden (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/552,166

(22) PCT Filed: Apr. 7, 2004

(86) PCT No.: PCT/EP2004/003723

§ 371 (c)(1),
(2), (4) Date: Dec. 27, 2006

(87) PCT Pub. No.: WO2004/090312

PCT Pub. Date: Oct. 21, 2004

(65) Prior Publication Data

US 2007/0137612 A1 Jun. 21, 2007

(30) Foreign Application Priority Data

Apr. 9, 2003 (DE) ................................. 103 16 113

(51) Int. Cl.
*F02B 5/00* (2006.01)
(52) U.S. Cl. .................. 123/305; 123/406.12; 123/350; 123/41.38; 123/71 R; 123/195 R; 701/103; 701/104; 701/105
(58) Field of Classification Search ............ 123/406.12, 123/350, 41.38, 71 R, 195 R, 305; 701/103–105
See application file for complete search history.

(56) References Cited

U.S. PATENT DOCUMENTS

| 4,596,220 A | * | 6/1986 | Oosuga et al. ............... 123/478 |
| 6,138,638 A | * | 10/2000 | Morikawa ................... 123/295 |
| 6,990,954 B2 | * | 1/2006 | Hochstrasser et al. .. 123/406.12 |
| 7,218,999 B2 | * | 5/2007 | Matsunaga et al. .......... 700/299 |

FOREIGN PATENT DOCUMENTS

| DE | 37 36 430 A1 | 5/1989 |
| DE | 196 06 680 A1 | 8/1996 |
| DE | 197 34 494 C1 | 10/1998 |
| DE | 197 49 817 A1 | 5/1999 |
| DE | 198 49 329 A1 | 4/2000 |
| DE | 100 08 553 A1 | 8/2001 |
| DE | 100 43 383 C2 | 6/2002 |
| EP | 0 859 149 A2 | 11/1997 |

OTHER PUBLICATIONS

Easley et al., The Path to a 50% Thermal Efficient Engine, Aug. 23, 2005, Caterpillar, pp. 4-28.*
International Search Report dated Jul. 28, 2004.

* cited by examiner

*Primary Examiner*—Stephen K Cronin
*Assistant Examiner*—Keith Coleman
(74) *Attorney, Agent, or Firm*—Crowell & Moring LLP

(57) ABSTRACT

A method for operating a compression-ignition internal combustion engine includes metering in a quantity of fuel as a function of an operating point of the engine during a working cycle, and injecting the quantity of fuel which is metered in into the combustion chamber in such a manner that a combustion center of gravity is positioned at a defined crank angle position independently of the operating point of the internal combustion engine.

19 Claims, 5 Drawing Sheets

METHOD FOR OPERATING A COMPRESSION IGNITION INTERNAL COMBUSTION ENGINE

BACKGROUND AND SUMMARY OF THE INVENTION

The invention relates to a method for operating a compression ignition internal combustion engine.

Two of the objectives in the development of new diesel internal combustion engines are to reduce the fuel consumption and to minimize exhaust emissions, in particular the emissions of nitrogen oxides and the formation of particulates. In modern compression ignition internal combustion engines, exhaust gas recirculation is often used as a means for lowering emission levels, with an exhaust gas recirculation rate being set as a function of the load point.

The nitrogen oxide emission levels can be lowered further by using an SCR catalytic converter, in which the addition or metering of a reducing agent, e.g., ammonia, is implemented proportionally to the formation of nitrogen oxides in the internal combustion engine. The required safety devices only permit limited conversion rates in an SCR catalytic converter of this type of between 60% and 70%, since the untreated nitrogen oxide emissions from the internal combustion engine can only be determined from known engine map data. At present, sensors for the direct measurement of the concentrations of nitrogen oxides or ammonia in the exhaust gas are still in the research stage, since sensors of this type are currently still excessively inaccurate or extremely sensitive to external influences.

The fuel economy of an internal combustion engine generally results only indirectly from the engine maps for the respective injection point stored in the engine control unit. There is no feedback or correction based on the current efficiency or fuel consumption of the internal combustion engine.

DE 197 34 494 C1 has disclosed a method for operating an internal combustion engine, in which a recirculation rate of the exhaust gas is calculated on the basis of a two-fold measurement of the oxygen concentration in the exhaust gas and in the charge air. In this method, in addition to the fact that the outlay on measuring equipment is high, only the recirculation rate of the exhaust gas is determined.

DE 100 43 383 C2 has disclosed a method for determining the nitrogen oxygen content in exhaust gases from internal combustion engines, in which the air mass fed to the internal combustion engine is recorded, with the combustion center of gravity being determined from at least one current measured value for the engine operation. The untreated NOx emissions are calculated from the value for the position of the combustion center of gravity and the values for the recorded fuel quantity and air mass.

The combustion center of gravity uses the first law of thermodynamics to describe the state in the combustion chamber in which 50% of the fuel energy introduced has been converted. The position of the center of gravity is the associated crank angle position, i.e. a crank angle position of the piston, at which 50% of the quantity of fuel participating in the combustion has been converted into heat.

The considerable outlay involved in the simultaneous determination of air, fuel and exhaust gas recirculation rates is disadvantageous, since a combustion chamber pressure profile resolved on the basis of the crank angle is required for the calculation of the combustion center of gravity, and this pressure profile is complex to determine by metrology.

Therefore, the invention is based on the object of providing a method for controlling an internal combustion engine which ensures consumption-optimized operation of the internal combustion engine combined, at the same time, with a drop in the NOx emissions.

According to the invention, this object is achieved by a method for operating a compression-ignition internal combustion engine. The method includes metering in a quantity of fuel as a function of an operating point of the engine during a working cycle, and injecting the quantity of fuel which is metered in into the combustion chamber in such a manner that a combustion center of gravity is positioned at a defined crank angle position independently of the operating point of the internal combustion engine.

In a method according to the invention, a quantity of fuel is metered in as a function of the operating point during a working cycle of the internal combustion engine is the metered quantity of fuel being injected into the combustion chamber in such a manner that a position of each combustion center of gravity is at a predetermined crank angle position independently of the operating point of the internal combustion engine.

According to the present invention, the efficiency of the compression ignition internal combustion engine is directly related to the position of the combustion center of gravity. In this case, the engine parameters are set in such a manner that the position of the center of gravity is at a defined crank angle position independently of the operating point currently being run during the respective combustion or during each combustion. This crank angle position can be determined for the respective internal combustion engine before it starts to operate, e.g., on an engine test bench. A maximum efficiency is achieved at this position of the combustion center of gravity which has been predetermined for the respective internal combustion engine. This predetermined position of the center of gravity should then as far as possible be maintained throughout the entire service life of the internal combustion engine.

According to a further configuration of the invention, a current position of the combustion center of gravity is determined as a function of a recorded pressure profile in the combustion chamber, the pressure profile in the combustion chamber preferably being recorded by a sensor. This achieves accurate determination of the position of the center of gravity. For this purpose, it is preferable to determine the current value of the center of gravity position of the combustion with the aid of a calculation model, so that the metrology outlay can be reduced further.

In a further configuration of the invention, the current combustion center of gravity is determined as a function of a crank angle position at which a maximum cylinder pressure is recorded in the combustion chamber. Accordingly, the center of gravity position of the combustion is determined with the aid of an empirical model by a point in time at which the maximum pressure in the cylinder, e.g., an ignition pressure, is reached. According to the present invention, the center of gravity position is dependent on the crank angle position of the maximum pressure occurring in the combustion chamber. This significantly simplifies determination of the combustion center of gravity, since there is no need for processing or detailed resolution of the entire cylinder pressure profile in the combustion chamber on the basis of the crank angle during combustion.

According to a further configuration of the invention, the current combustion center of gravity is determined as a function of a fuel injection duration, the start of fuel injection, a charge mass in the combustion chamber and the speed of the internal combustion engine. In this context, the charge mass can be taken from the engine maps stored in the engine control device, in order to simplify the method. As a result, determination of the combustion center of gravity using an empirical model is further simplified. Therefore, rapid calculation or determination of the position of the combustion center of gravity can be achieved without having to use complex sensors in the combustion chamber.

According to a further configuration of the invention, an exhaust gas recirculation quantity for setting a defined oxygen concentration in the combustion chamber is set as a function of the center of gravity position of the combustion. In this case, the required exhaust gas recirculation rate is calculated from the determined untreated NOx emission from the internal combustion engine, and the exhaust gas recirculation is controlled until a defined oxygen concentration is established in the combustion chamber. It is preferable for a desired value for the oxygen concentration to be stored as a constant value in an engine map for the internal combustion engine stored in the engine control device.

In one configuration of the method according to the invention, the position of the combustion center of gravity is set by varying the start of the compression ignition and/or by varying the fuel injection. This results in targeted and rapid control of the internal combustion engine at the respective load point, so that the internal combustion engine can operate with a maximum efficiency and reduced formation of untreated NOx emissions.

Further features and combinations of features will emerge from the description. Specific exemplary embodiments of the invention are illustrated in simplified form in and explained in more detail with reference to the following drawings.

DETAILED DESCRIPTION OF THE DRAWINGS

Figure 1:
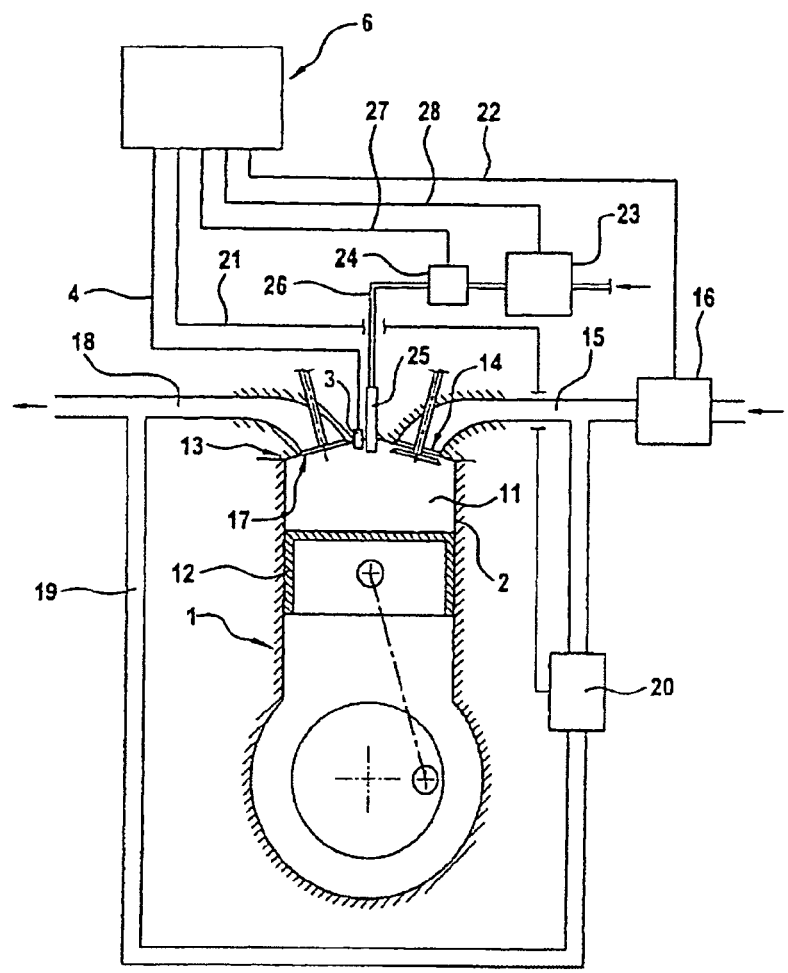
FIG. 1 shows a cross section through a cylinder of a direct injection compression ignition internal combustion engine, FIG. 2 diagrammatically depicts an efficiency curve for an internal combustion engine as shown in FIG. 1 as a function of the position of the combustion center of gravity.

FIG. 1 illustrates a cross section through a cylinder block 1 of a compression ignition internal combustion engine with direct injection. A piston 12 is guided displaceably in a cylinder 2, and the top side of this piston, together with a cylinder head 13, delimits a combustion chamber 11. An intake valve 14 and an exhaust valve 17 are arranged in the cylinder head 13, with the combustion air which is required being fed to the combustion chamber 11 through the intake valve 14 via an induction pipe 15. It is preferable for the respective air mass to be recorded by an air mass measuring device 16, which is connected to an engine control device 6 via a line 22.

Combustion gases pass through the exhaust valve 17 into an exhaust pipe 18, which leads to an exhaust gas aftertreatment device (not shown in the drawing). This exhaust gas aftertreatment device in particular includes an SCR catalytic converter for effectively lowering the NOx emission levels. Furthermore, an exhaust gas recirculation line 19 which branches off from the exhaust pipe 18 serves to recirculate combustion gases into the induction pipe 15. A flow meter 20 for recording the flow of exhaust gas which is recirculated and setting the quantity of exhaust gas which is recirculated is located in this exhaust gas recirculation line 19. The recorded quantity of recirculated exhaust gas is transmitted to the engine control device 6 via a line 21.

Furthermore, a pressure sensor 3, which transmits the pressure which is present in the combustion chamber via a connecting line 4 to the engine control device 6, is arranged in the combustion chamber 11, in the cylinder head 13. A fuel injection valve 25, which is connected to an injection pump 23 via an injection line 26, is also arranged in the cylinder head 13. A measuring apparatus 24 for recording the fuel quantity is provided between the injection pump 23 and the fuel injection valve 25. This fuel measuring device 24 is connected to the engine control device 6 via an electric line 27. The injection pump 23 is likewise connected to the engine control device by a control line 28.

Figure 2:
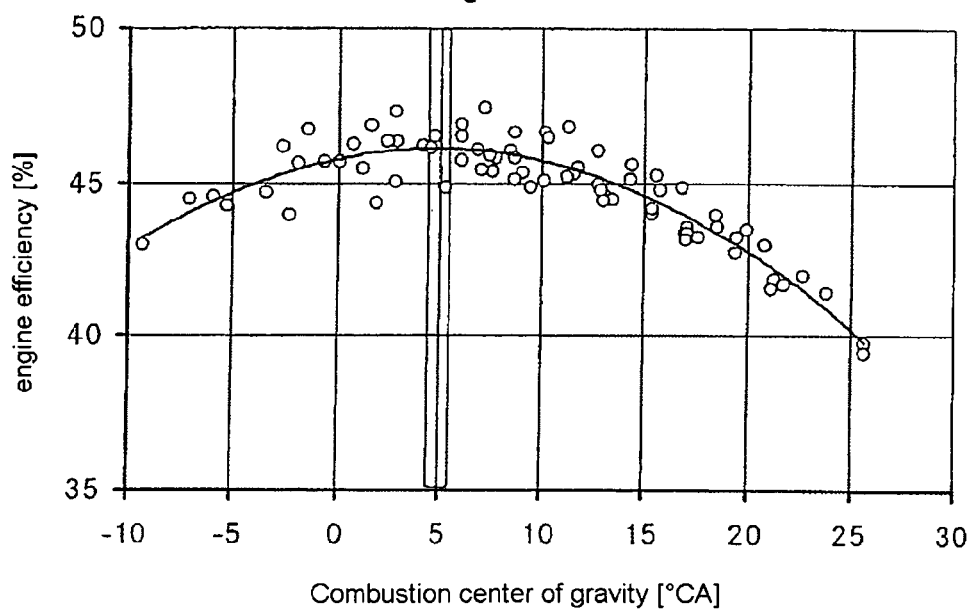

The method according to the invention is aimed at operating the internal combustion engine with optimized consumption, a high efficiency and as far as possible at the same time minimized NOx emissions. According to the invention, the fuel injection valve 25 is used to introduce a quantity of fuel which is dependent on the operating point into the combustion chamber 11. This quantity of fuel is introduced into the combustion chamber 11 in such a manner that a defined position of the center of gravity is at a constant and predetermined crank angle position during each combustion operation, i.e. independently of the operating point. As shown in FIG. 2, operation of the internal combustion engine is optimized in terms of consumption at this predetermined center of gravity position of the combustion (desired center of gravity), which is stored in engine control device 6. To ensure consumption-optimized operation, a current center of gravity position for the combustion is determined and compared with the desired center of gravity. If there is any deviation, required operating parameters are altered until the position of the combustion as far as possible corresponds to the desired center of gravity.

Since, in accordance with the present invention, the efficiency of the compression ignition internal combustion engine is directly related to the position of the combustion center of gravity, the engine parameters, in particular the fuel injection parameters, such as injection point, injection duration and injection cycle, are set in such a manner that the optimum position of the center of gravity is present during the respective combustion or during each combustion. The optimum position of the combustion or the desired combustion center of gravity can be determined for the respective internal combustion engine, for example on an engine test bench. This desired value is then stored in the engine control device 6 for the respective internal combustion engine.

The center of gravity position can be set or the current value can be adapted to the desired value by means of varying the start of compression ignition and/or by means of varying the fuel injection. As a result, targeted and rapid control of the internal combustion engine is carried out at the respective load point, so that the internal combustion engine is operated with a high efficiency. If, for example, the load-dependent fuel quantity is introduced into the combustion chamber 11 in the form of a preinjection, a main injection and optionally also an afterinjection, it is possible for both the injection points and the fuel quantity ratios of the respective partial quantities to be varied in order to adapt the current center of gravity position of the combustion to the desired value. Furthermore, the fuel injection pressures of the preinjection, the main injection and the optional afterinjection can be varied.

Various methods for determining the position of the center of gravity are known. The conventional calculation method is based on the analysis of the cylinder pressure curve of the respective combustion. The first law of thermodynamics is used as a basis for this. This method requires the pressure profile in the combustion chamber, the change in volume, a model for the wall heat losses and the charge mass to determine the current center of gravity position.

Alternatively, the position of the center of gravity can be determined from the heating profile of the combustion. This accordingly requires temperature-dependent calculation of the internal energy or the polytropic exponent. This is likewise based on the first law of thermodynamics, and it is necessary to know the pressure profile in the combustion chamber, the change in volume and the charge mass of the respective combustion. This method can be carried out as an on-line calculation on the engine test bench or at the engine in the engine control device. This method has only minor deviations from the first calculation method.

According to the invention, a further method for determining the position of the center of gravity can be carried out with the aid of an empirical model made up of injection data, such as start of injection, injection duration, and the engine speed of the internal combustion engine if the charge mass is known, the charge mass preferably being stored in an engine map stored in the engine control device 6. According to the invention, the center of gravity position in degrees crank angle is determined primarily by the data for the start of injection, the injected fuel quantity or injection duration and the engine speed. Late starts of injection, higher injection quantities and engine speeds shift the center of gravity position away from a top dead center TDC into the expansion phase. The air mass in the cylinder 2 also has a slight influence.

An equation for calculating the position of the center of gravity in degrees crank angle reads as follows:

$$SP=a_0+a_1 \cdot SB+a_2 \cdot SD+a_3 \cdot t+a_4 \cdot m_{Cyl}.$$

Figure 5:
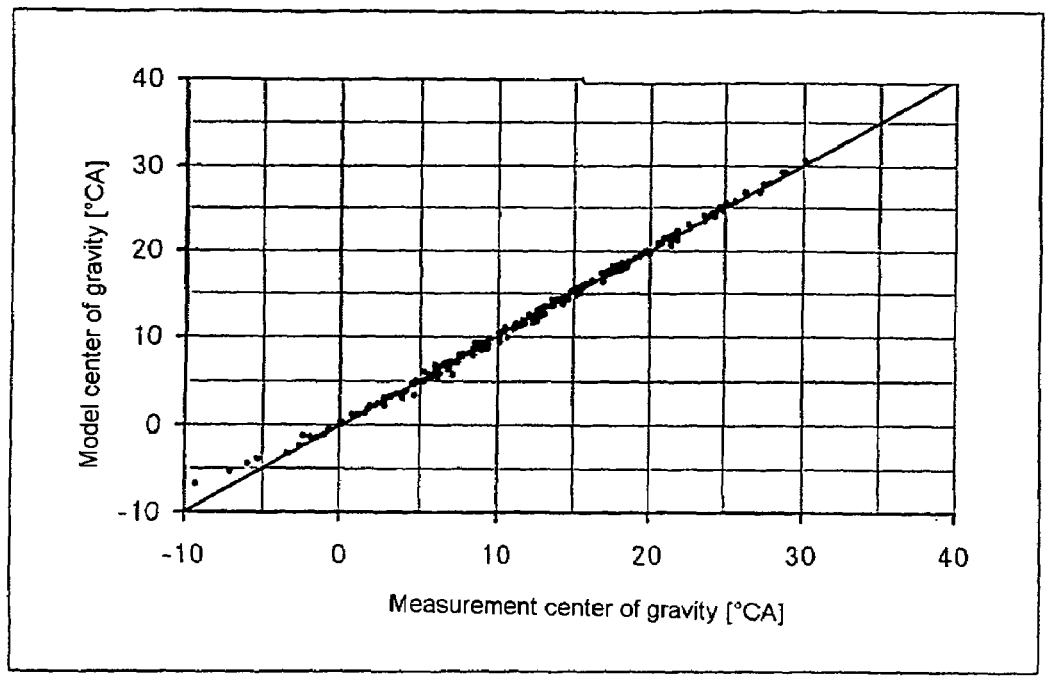

In this equation, SP denotes the position of the combustion center of gravity, SB denotes the start of injection, SD denotes the injection duration, t denotes the time per working cycle, $m_{Cyl}$ denotes the charge mass. The coefficients $a_0$ to $a_4$ are model coefficients for the respective internal combustion engine. The quality of the model in accordance with the above equation can be seen from the illustration in FIG. 5, which reveals a good correlation between the position of the center of gravity determined by the model and a position of the combustion center of gravity calculated using the first law of thermodynamics.

The pressure sensor 3 provided in the combustion chamber 11 is preferably used to record a pressure profile in the combustion chamber 11 during a working cycle and to transmit this pressure profile to the engine control device 6. The current center of gravity position of the combustion can be determined from the pressure profile recorded. The position of the center of gravity changes with respect to the crank angle if the combustion profile changes. An efficiency of the internal combustion engine, which in accordance with FIG. 2 is directly related to the position of the combustion center of gravity, is determined with the aid of the engine control device 6 using the recorded pressure profile and the metered quantity of fuel for each working cycle. In this case, the combustion center of gravity can be calculated from the indexing of the cylinder pressure in combination with measurement of the piston position in the combustion chamber using the first law of thermodynamics.

In accordance with FIG. 2, a maximum efficiency in the internal combustion engine is to be set for a defined position of the center of gravity independently of the load point. In this case, it is necessary to control the combustion in such a manner that the position of the combustion center of gravity is at the piston position at which the maximum efficiency is reached, e.g., in accordance with FIG. 2 at 5° CA after TDC. This may generally be a narrow range, i.e. a crank angle window, which is aimed for by the engine control device 6.

Figure 3:
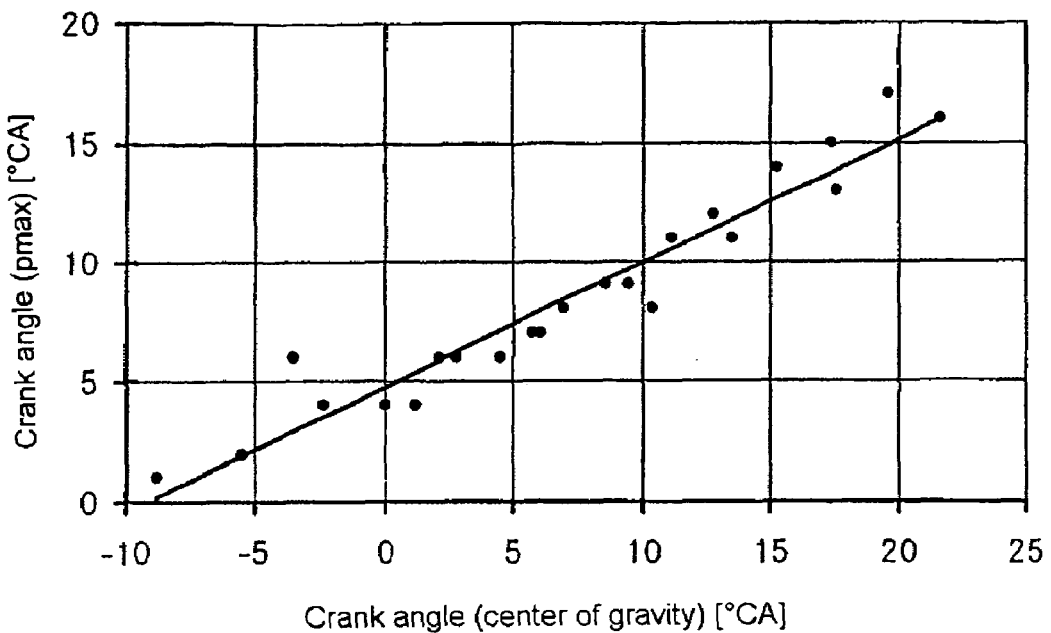
FIG. 3 shows a schematic diagram of the position of the maximum cylinder pressure of the internal combustion engine shown in FIG. 1 as a function of the position of the combustion center of gravity, FIG. 4 diagrammatically depicts a comparison between two calculation methods used to determine the position of the combustion center of gravity, FIG. 5 diagrammatically depicts a correlation between a measured position of the center of gravity and a position of the center of gravity calculated in accordance with a model, FIG. 6 diagrammatically depicts a gas temperature curve in the combustion chamber of an internal combustion engine as shown in FIG. 1 during combustion, FIG. 7 diagrammatically depicts a relationship between a gradient of the gas temperature and the untreated NOx emission from an internal combustion engine as shown in FIG. 1, FIG. 8 diagrammatically depicts the maxima for mean gas temperature in the combustion chamber as a function of the instantaneous untreated NOx emission from an internal combustion engine as shown in FIG. 1, FIG. 9 diagrammatically depicts the curve of an NOx reduction rate as a function of an exhaust gas recirculation rate, and FIG. 10 diagrammatically depicts the curve of an NOx reduction rate as a function of an oxygen concentration in the combustion air of an internal combustion engine as shown in FIG. 1.

Alternatively, the crank angle position of a maximum combustion chamber pressure can be used for accurate and fast determination of the center of gravity position of the combustion. In this case, in accordance with FIG. 3, there is a direct empirical relationship between the maximum combustion chamber pressure which occurs and the position of the center of gravity during a working cycle. According to the invention, the center of gravity position can preferably be determined from an ignition pressure using an empirical model. The maximum cylinder pressure and the associated crank angle position are recorded for this purpose.

Figure 4:
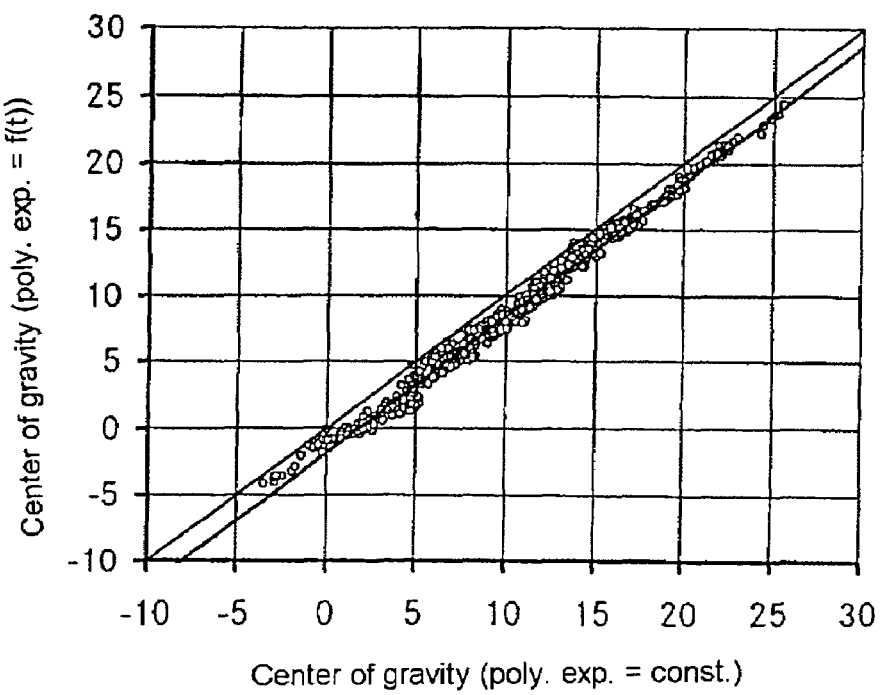

Furthermore, according to the invention, the first law of thermodynamics can be used to determine the position of the center of gravity from the heating profile with a constant polytropic exponent, taking into account the pressure profile and the change in volume, in which case there is no need to record the air mass in the cylinder. In accordance with FIG. 4, this method likewise reveals a good correlation with measurement methods which have previously been disclosed.

Figure 6:
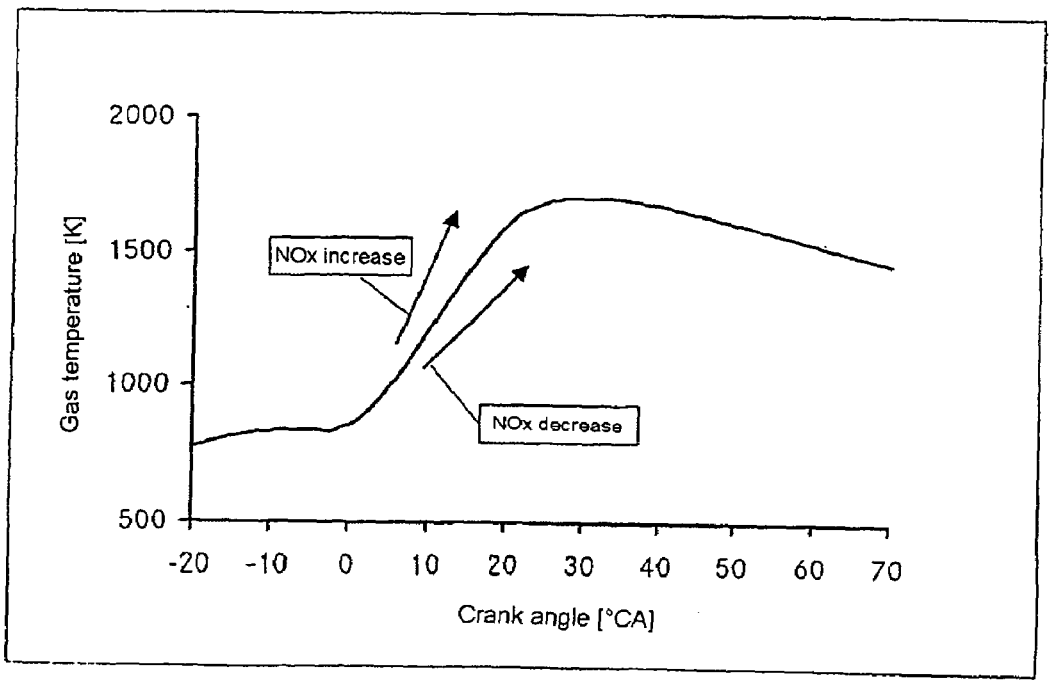
Figure 7:
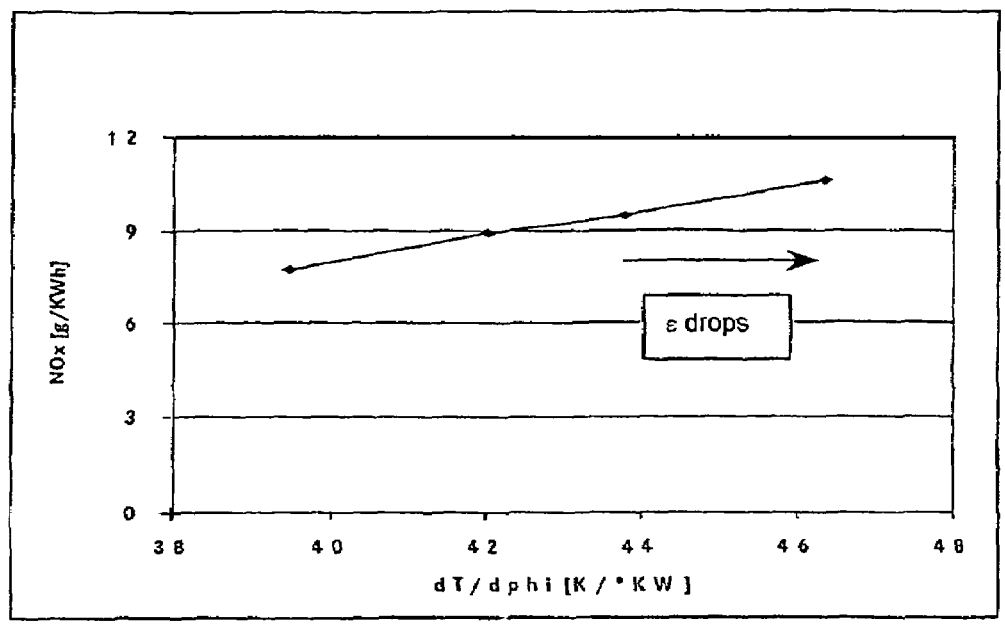

The present invention can likewise be used to determine the untreated NOx emissions from the compression ignition internal combustion engine, so that the operating mode or setting of the exhaust gas aftertreatment device (not shown in FIG. 1) is optimized. In accordance with the invention, the profile of a mean gas temperature in the combustion chamber 11 of the internal combustion engine is determined, so that a gradient of the gas temperature with respect to a change in crank angle dT/dphi in a defined crank angle window is calculated, as shown in FIG. 6, and the untreated NOx emissions from the internal combustion engine are determined from this information, as shown in FIG. 7.

Figure 8:
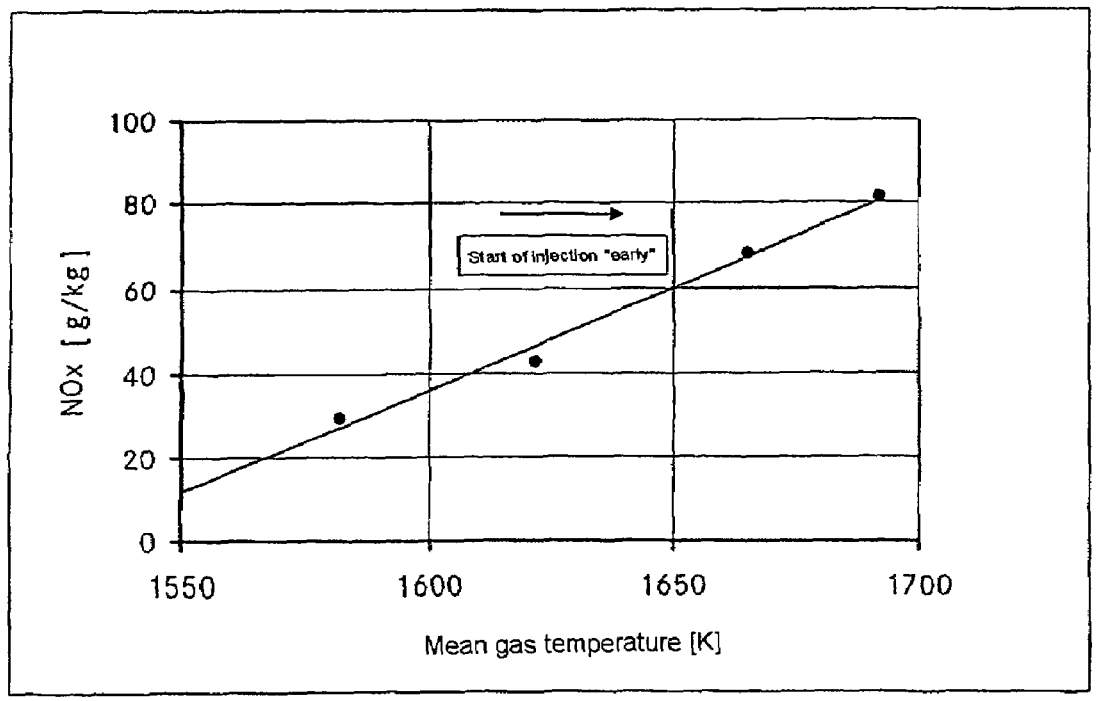

According to the invention, the gradient of the gas temperature in a defined crank angle range is directly related to the untreated NOx emissions from the internal combustion engine. Therefore, determination of the untreated NOx emissions from the internal combustion engine is carried out accurately and quickly, for example in order to optimize a downstream exhaust gas aftertreatment device. FIG. 8 illustrates the relationship between the maximum mean gas temperature in the combustion chamber and an instantaneous untreated emission of NOx from the internal combustion engine. Accordingly, the formation of the NOx emissions during combustion can be minimized if the combustion is controlled accordingly. In this case, the fuel mass metered to the combustion chamber is controlled until a constant crank angle position of the combustion center of gravity is achieved.

Figure 9:
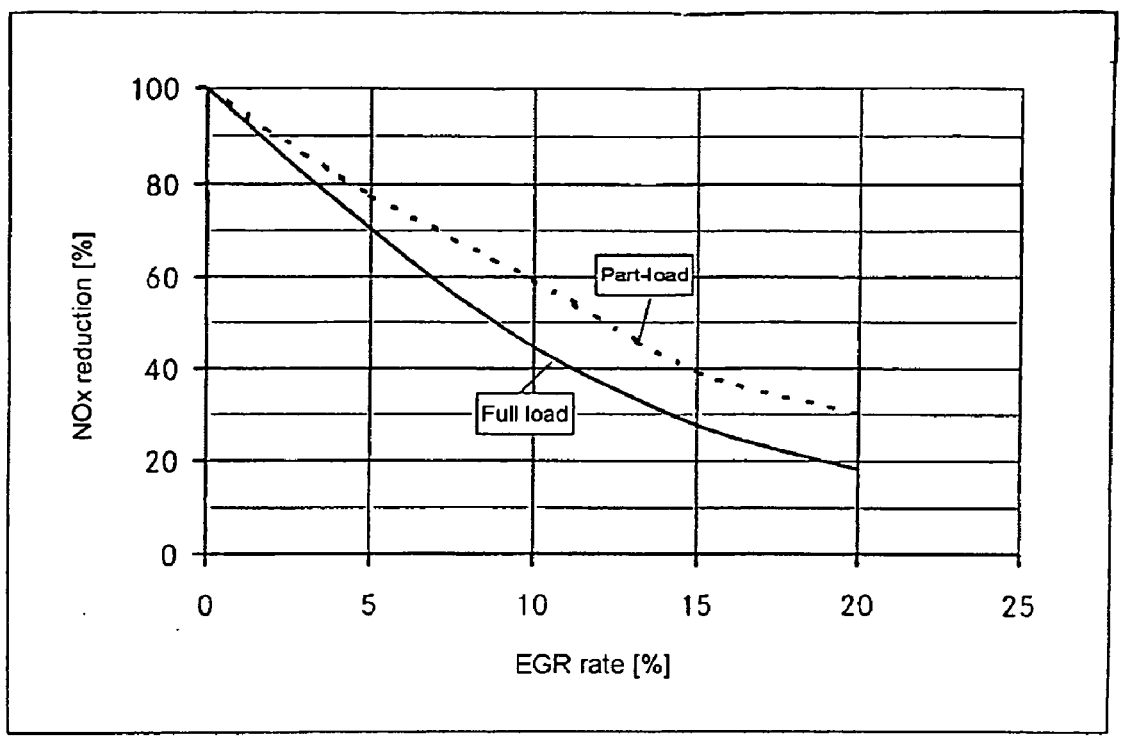

In general, a relative NOx reduction can be achieved by exhaust gas recirculation. Accordingly, the relative NOx reduction is directly related to the oxygen concentration of the cylinder charge. In accordance with FIG. 9, in the current state of the art, different percentage reductions in nitrogen oxides result from the same exhaust gas recirculation rates, depending on the load point of the internal combustion engine. By contrast, according to the invention the oxygen concentration of the cylinder charge is used as a measurement or control variable. Accordingly, a defined oxygen concentration of the combustion air is then established in the combustion chamber 11. In accordance with FIG. 10, this is measured and used as a control and measurement variable.

Figure 10:
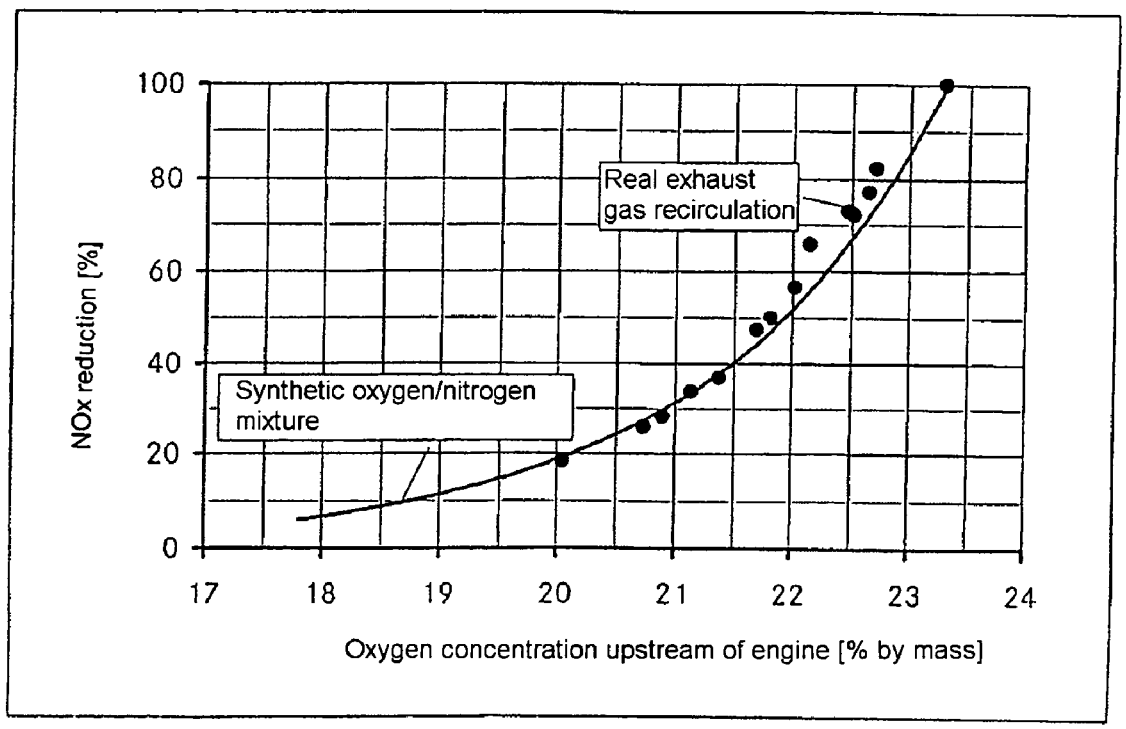

The untreated NOx emissions from the internal combustion engine which are determined from a maximum value for the mean gas temperature in the combustion chamber in accordance with FIG. 8 are then used for the required NOx reduction aimed for, and in accordance with FIG. 10 an exhaust gas recirculation rate is determined on this basis. Accordingly, the exhaust gas recirculation quantity is controlled in such a manner as to establish a defined oxygen concentration in the intake duct 15 in accordance with FIG. 10. A desired value for the oxygen concentration is preferably stored in the engine control device 6 as a constant value in an engine map. According to the invention, the relationship between an NOx reduction rate and an exhaust gas recirculation rate illustrated in FIG. 10 is used for this purpose. As a result, the exhaust gas recirculation quantity is set in such a manner that there is a defined oxygen concentration in the intake air in the intake duct 15. Therefore, an NOx emission formed in the combustion chamber is reduced, and the exhaust gas aftertreatment provided for this purpose is optimized, so that, for example, the optimum quantity of $NH_3$ can be metered in with the aid of the present invention in a downstream SCR catalytic converter.

The invention claimed is:

1. A method for operating a compression-ignition internal combustion engine having a cylinder, in which a combustion chamber is delimited between a piston and a cylinder head, an engine control device and a fuel feed device, said method comprising:
   during a working cycle, metering a quantity of fuel that is determined as a function of an operating point of said engine;
   injecting said quantity of fuel into the combustion chamber during said working cycle; and
   Adjusting engine parameters in such a manner that the position of a combustion center of gravity is maintained at a defined crank angle position, independently of the operating point of the internal combustion engine.

2. The method as claimed in claim 1, wherein said step adjusting engine parameters comprises:
   determining a current position of the combustion center of gravity as a function of a recorded pressure profile in the combustion chamber;
   comparing said current position of the combustion center of gravity with said defined crank angle position; and
   altering said engine parameters until the current position of the combustion center of gravity corresponds to said defined crank angle position.

3. The method as claimed in claim 2, wherein the current position of the combustion center of gravity is determined as a function of a crank angle position at which a maximum cylinder pressure is recorded in the combustion chamber.

4. The method as claimed in claim 1, wherein said engine parameters include at least one of a fuel injection duration, a start of fuel injection, a charge mass in the combustion chamber and a speed of the internal combustion engine.

5. The method as claimed in claim 4, wherein an exhaust gas recirculation quantity for setting a defined oxygen concentration in the combustion chamber is set as a function of the combustion center of gravity.

6. The method as claimed in claim 5, wherein the position of the combustion center of gravity is set by one of i) varying a start of compression ignition, and ii) varying the fuel injection.

7. The method as claimed in claim 1, wherein the current position of the combustion center of gravity is determined as a function of a crank angle position at which a maximum cylinder pressure is recorded in the combustion chamber.

8. The method as claimed in claim 1, wherein an exhaust gas recirculation quantity for setting a defined oxygen concentration in the combustion chamber is set as a function of the combustion center of gravity.

9. The method as claimed in claim 1, wherein the position of the combustion center of gravity is set by one of i) varying a start of compression ignition, and ii) varying the fuel injection.

10. A method for operating a compression-ignition internal combustion engine, said method comprising:
    metering a quantity of fuel as a function of an operating point during a working cycle;
    injecting said quantity of fuel into a combustion chamber of said engine:
    determining a current position of a combustion center gravity;
    comparing said determined current position with a preset desired position of said combustion center of gravity; and
    adjusting operating parameters of said engine in such a manner that a combustion center of gravity is positioned at a defined crank angle position, independently of the operating point of the Internal combustion engine.

11. The method as claimed in claim 10, wherein the position of the combustion center of gravity is determined as a function of a pressure profile in the combustion chamber.

12. The method as claimed in claim 11, wherein the pressure profile in the combustion chamber is recorded with a sensor.

13. The method as claimed in claim 11, wherein the current position of the combustion center of gravity is determined as a function of a crank angle position at which a maximum cylinder pressure is recorded in the combustion chamber.

14. The method as claimed in claim 10, wherein the position of the combustion center of gravity is determined as a function of at least one of a fuel injection duration, a start of fuel injection, a charge mass in the combustion chamber, and speed of the internal combustion engine.

15. The method as claimed in claim 14, further comprising setting an exhaust gas recirculation quantity for setting a defined oxygen concentration in the combustion chamber as a function of the combustion center of gravity.

16. The method as claimed in claim 15, further comprising setting the position of the combustion center of gravity by varying at least one of the start of compression ignition and the fuel injection.

17. The method as claimed in claim 10, wherein the current position of the combustion center of gravity is determined as a function of a crank angle position at which a maximum cylinder pressure is recorded in the combustion chamber.

18. The method as claimed in claim 10, further comprising setting an exhaust gas recirculation quantity for setting a defined oxygen concentration in the combustion chamber as a function of the combustion center of gravity.

19. The method as claimed in claim 10, further comprising setting the position of the combustion center of gravity by varying at least one of the start of compression ignition and the fuel injection.

* * * * *